(12) United States Patent  (10) Patent No.: US 8,091,838 B2
Sun  (45) Date of Patent: Jan. 10, 2012

(54) MOUNTING MECHANISM FOR STORAGE DEVICE

(75) Inventor: Zheng-Heng Sun, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 156 days.

(21) Appl. No.: 12/650,439

(22) Filed: Dec. 30, 2009

(65) Prior Publication Data

US 2011/0121146 A1    May 26, 2011

(30) Foreign Application Priority Data

Nov. 20, 2009    (CN) .......................... 2009 1 0310165

(51) Int. Cl.
*G12B 9/00* (2006.01)
*A47B 96/00* (2006.01)
*A47K 1/00* (2006.01)
*A47K 5/00* (2006.01)
*E04G 5/06* (2006.01)
*G06F 1/16* (2006.01)

(52) U.S. Cl. ............... 248/27.1; 248/225.11; 248/309.1; 248/221.11; 248/224.51; 248/223.41; 248/229.11; 248/231.31; 361/679.33; 439/928.1; 312/223.2

(58) Field of Classification Search ................. 248/27.1, 248/222.11, 225.11, 309.1, 221.11, 224.41, 248/223.41, 694, 544, 229.11, 231.31; 361/679.33, 685; 439/928.1; 312/332.1, 223.2

See application file for complete search history.

(56) References Cited

U.S. PATENT DOCUMENTS

| 6,123,314 | A  | * | 9/2000 | Steele ............................ 248/681 |
| 7,441,744 | B2 | * | 10/2008 | Chen et al. .................... 248/694 |
| 2007/0035922 | A1 | * | 2/2007 | Jiang et al. .................... 361/685 |
| 2008/0128579 | A1 | * | 6/2008 | Chen et al. .................... 248/694 |
| 2010/0276557 | A1 | * | 11/2010 | Cheng ...................... 248/221.11 |

FOREIGN PATENT DOCUMENTS

CN    200910309071    * 10/2009

* cited by examiner

*Primary Examiner* — Terrell McKinnon
*Assistant Examiner* — Christopher Garft
(74) *Attorney, Agent, or Firm* — Altis Law Group, Inc.

(57) ABSTRACT

A mounting mechanism for assembling a storage device includes a fixing member, a rotary member rotatably connected to the fixing member, and a pair of brackets extending from the fixing member. A resisting face is formed at a lateral side of the rotary member for engaging with the storage device. The pair of brackets are parallel to each other. A space is defined between the brackets for accommodating the storage device. A sliding groove is defined in each of the brackets. The sliding groove includes a split and an opening intercommunicating the split and on a side. The opening is closer to the fixing member relative to the split.

12 Claims, 7 Drawing Sheets

MOUNTING MECHANISM FOR STORAGE DEVICE

BACKGROUND

1. Technical Field

The present disclosure relates to a mounting mechanism, and particularly, to a mounting mechanism which facilitates attachment of a storage device to a computer chassis.

2. Description of Related Art

Storage devices, such as hard disk drives, compact disk read-only memory (CD-ROM), digital video disc (DVD) and floppy disk drives among others, are typically secured in a computer chassis with screws. Operating threaded elements involving such devices is complicated and time-consuming.

What is needed, therefore, is a mounting mechanism to overcome the associated limitations.

DETAILED DESCRIPTION

Figure 1:
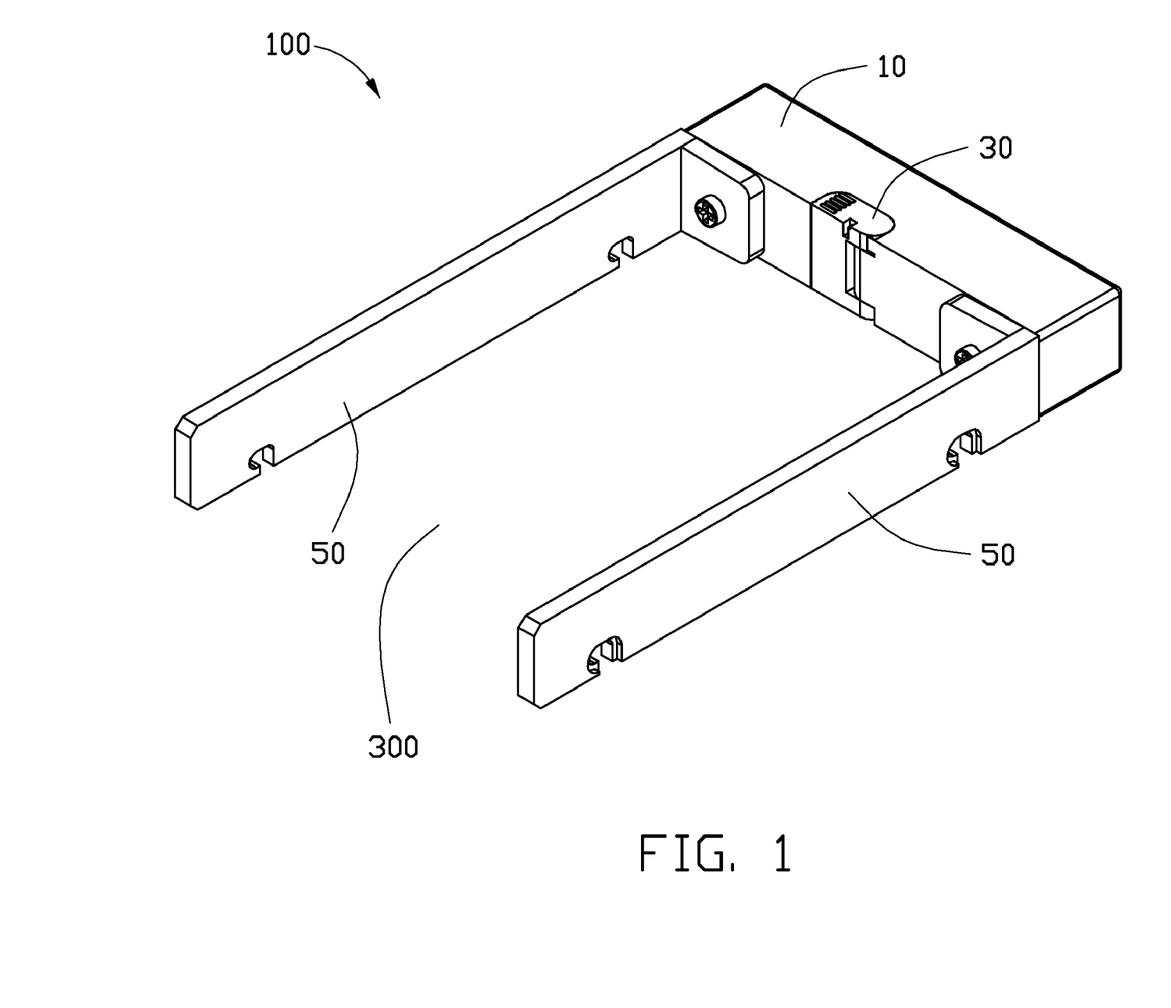
FIG. 1 is an isometric, assembled view of a mounting mechanism according to an exemplary embodiment.
Figure 4:
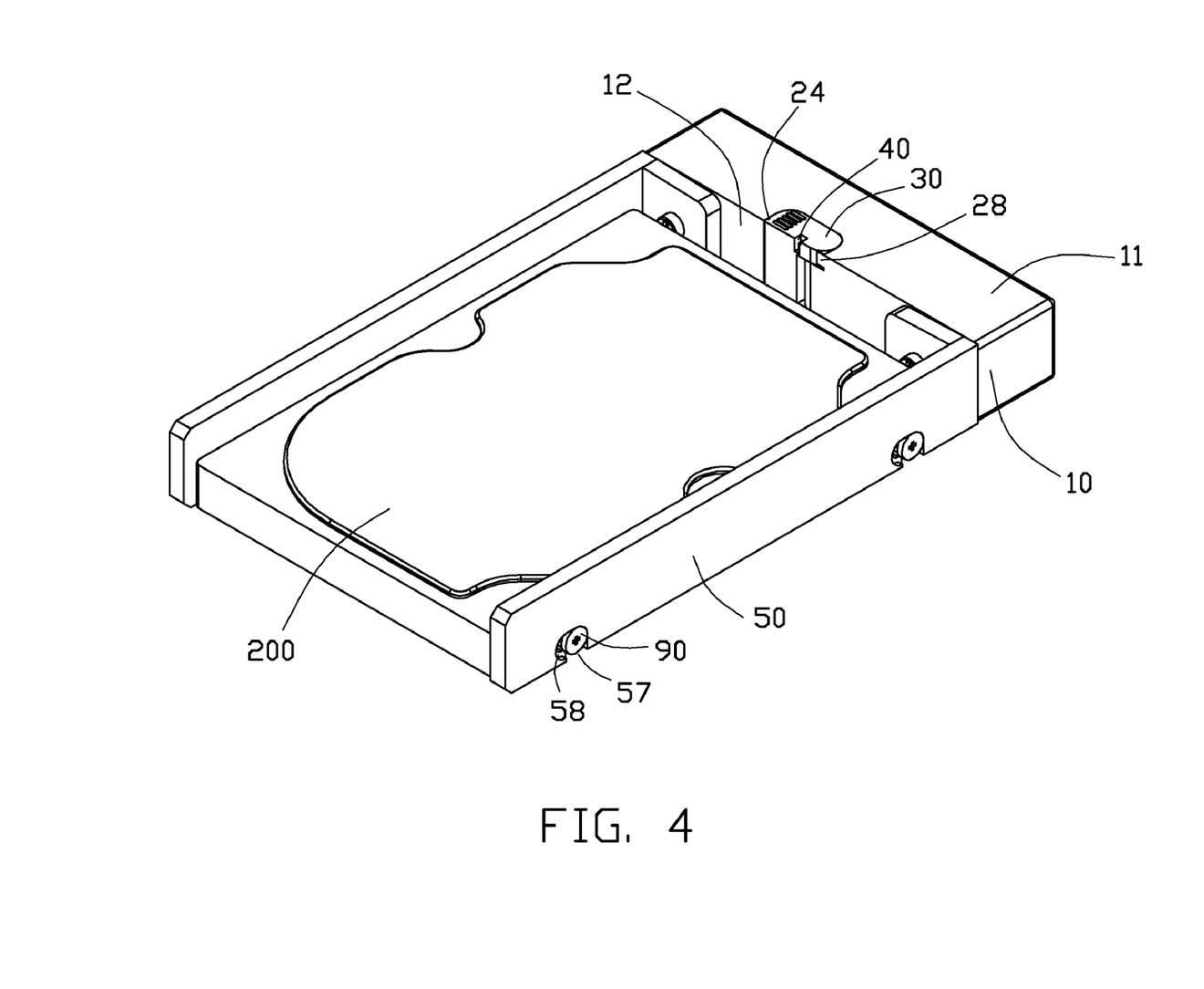
FIG. 4 shows a storage device being mounted on the mounting mechanism of FIG. 1.

Referring to FIGS. 1 and 4, a mounting mechanism 100 for holding a storage device 200 in a computer chassis (not shown), according to an exemplary embodiment, includes a fixing member 10, a rotary member 30 and a pair of brackets 50. In this embodiment, a plurality of bolts 90 is fixed on opposite sides of the storage device 200 for assembling the storage device 200 to the mounting mechanism 100.

Figure 2:
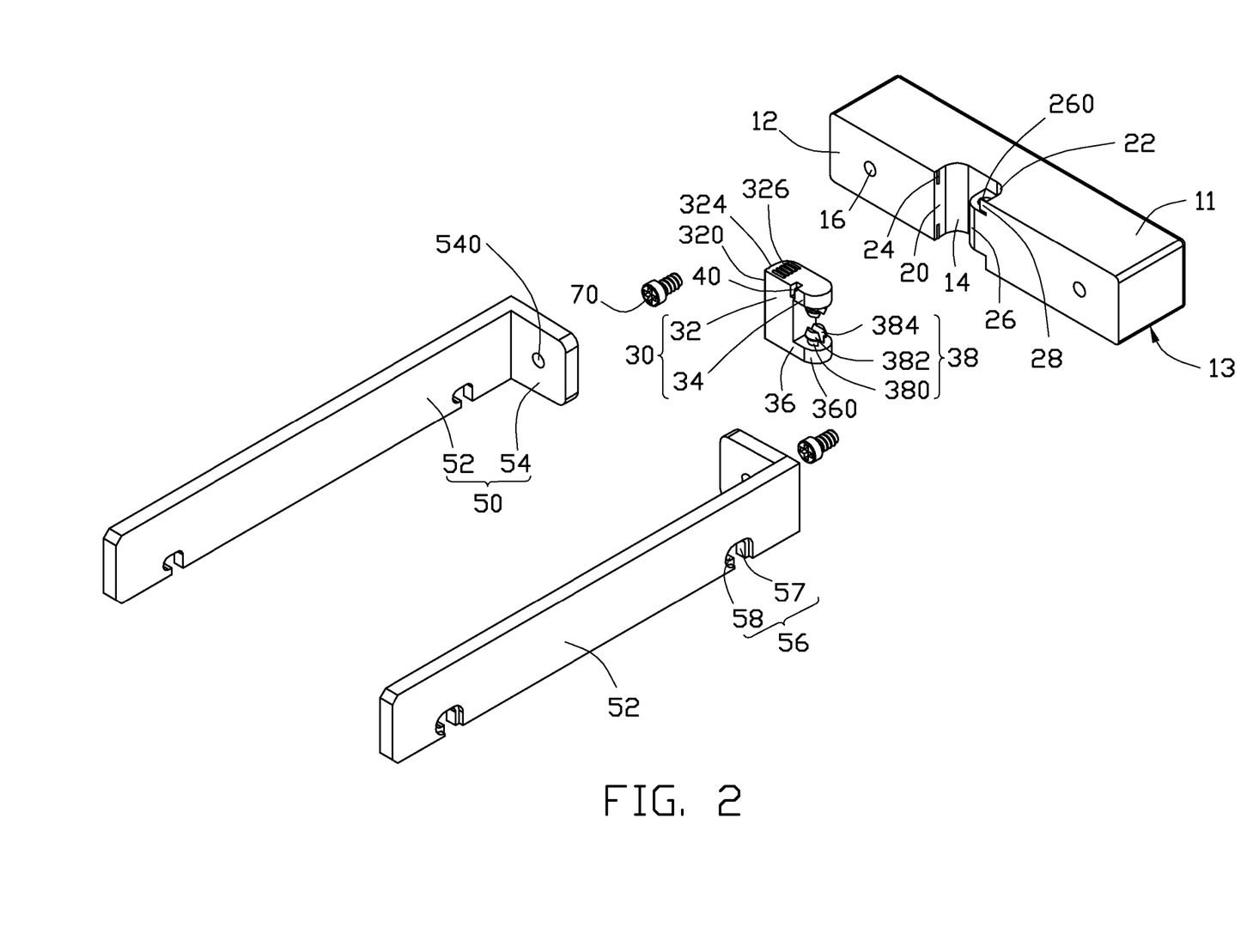
FIG. 2 is an exploded view of the mounting mechanism of FIG. 1.
Figure 3:
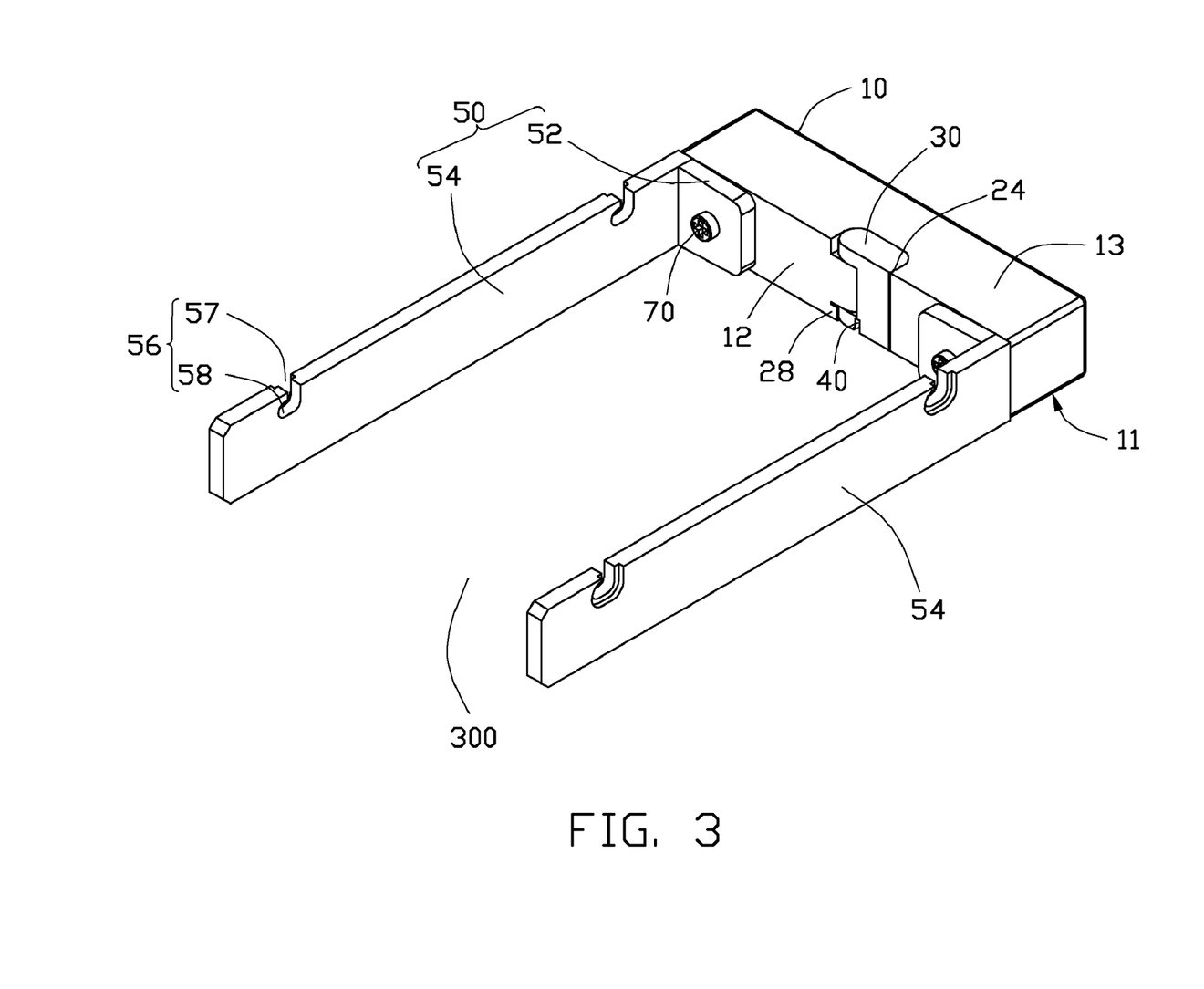
FIG. 3 is an inverted view of FIG. 1.

Referring to FIGS. 2 and 3, the fixing member 10 is elongated, and is fixed on the computer chassis. The fixing member 10 includes an upper face 11, a lower face 13, and a side face 12 between the upper face 11 and the lower face 13. A bore 16 is defined in the side face 12 of the fixing member 10 adjacent to each end of the side face 12. A receiving groove 14 is defined at the middle of the side face 12 of the fixing member 10. The receiving groove 14 is located between the bores 16. The receiving groove 14 extends through the fixing member 10 from the upper face 11 to the lower face 13. A first interface 20 and a second interface 22 are formed on the fixing member 10 around the receiving groove 14. The first interface 20 and the second interface 22 face each other, and both are perpendicular to the side face 12, the upper face 11, and the lower face 13 of the fixing member 10.

Two bulges 24 protrude from the first interface 20 into the receiving groove 14. The two bulges 24 are collinear, and are located adjacent to the upper face 11 and the lower face 13 of the fixing member 10, respectively. A sleeve 26 extends from the second interface 22 into the receiving groove 14. The height of the sleeve 26 is less than that of the fixing member 10. The top end of the sleeve 26 is lower than the upper face 11 and the bottom end is higher than the lower face 13 of the fixing member 10. An axial hole 260 extends through the sleeve 26 from the bottom end to the top end. A hook 28 extends from the junction of the second interface 22 and the side face 12. The hook 28 is located on the top end of the sleeve 26.

The pair of brackets 50 are fixed on the side face 12 of the fixing member 10. The brackets 50 are the same as each other. Each bracket 50 is L-shaped, and includes a supporting plate 52 and a connecting plate 54 perpendicularly intersecting with the supporting plate 52. A through hole 540 is defined in each of the connecting plate 54. When assembled, the brackets 50 are arranged facing each other. The connecting plates 54 of the brackets 50 attach opposite ends of the side face 12 of the fixing member 10, respectively. The through holes 540 of the connecting plates 54 are aligned with the bores 16 of the fixing member 10. Screws 70 respectively extend through the through holes 540 of the connecting plates 54 of the brackets 50, and engage in the bores 16 of the fixing member 10 to fix the brackets 50 on the fixing member 10.

The supporting plates 52 of the two brackets 50 are parallel to each other, and both are perpendicular to the fixing member 10. Each supporting plate 52 is elongated. A space 300 is defined between the supporting plates 52 to accommodate storage device 200 therein. The space 300 is slightly longer than the storage device 200 and the width 300 is substantially the same as that of the storage device 200. A plurality of sliding grooves 56 is defined in each of the supporting plates 52. The number of sliding grooves 56 is the same as that of the bolts 90 of the storage device 200. Each sliding receiving groove 14 includes a split 58 for accommodating the bolt 90 and an opening 57 interconnecting the split 58 with the bottom side of the bracket 50. The opening 57 is closer to the fixing member 10 relative to the split 58.

Figure 5:
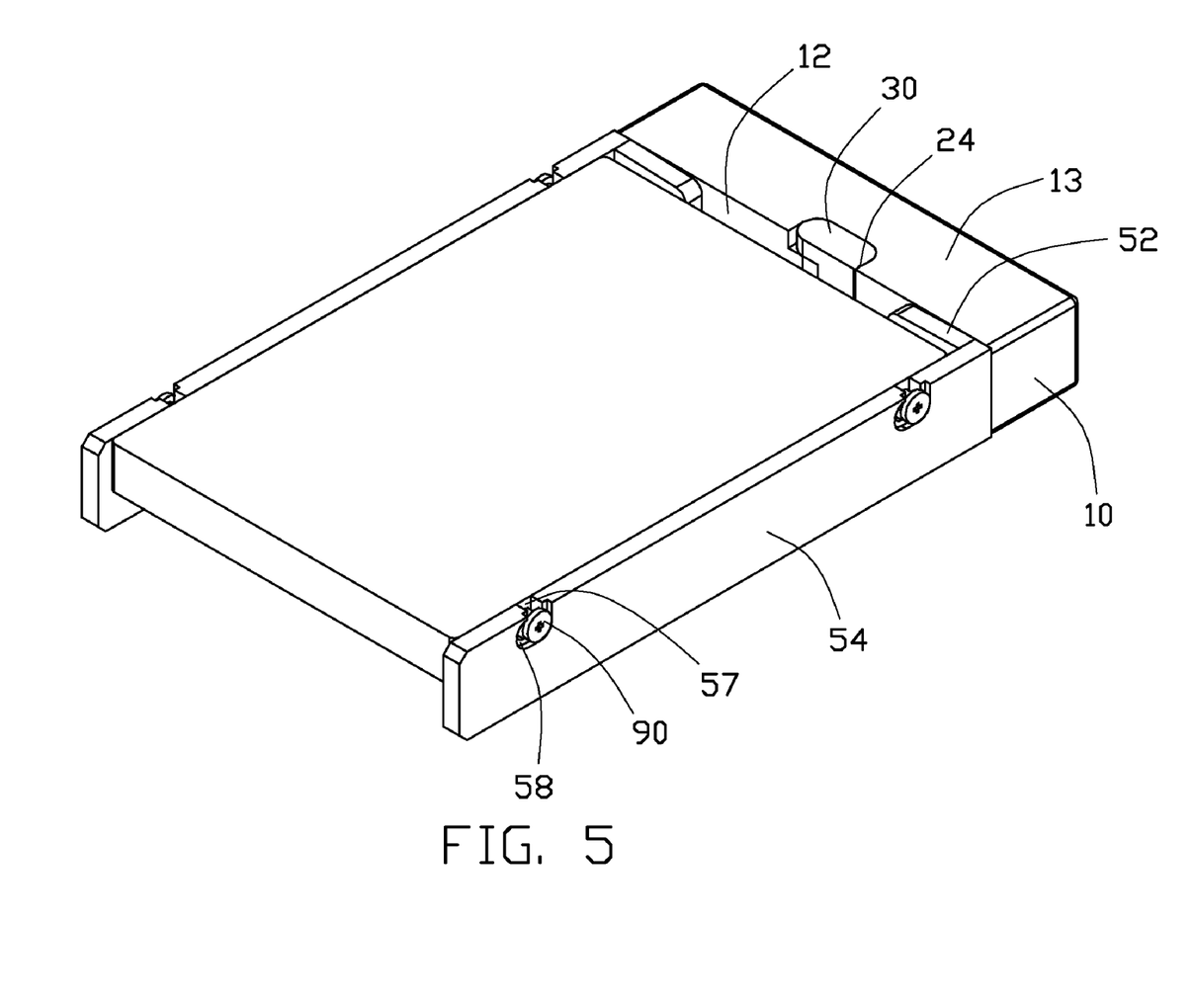
FIG. 5 is an inverted view of FIG. 4.
Figure 6:
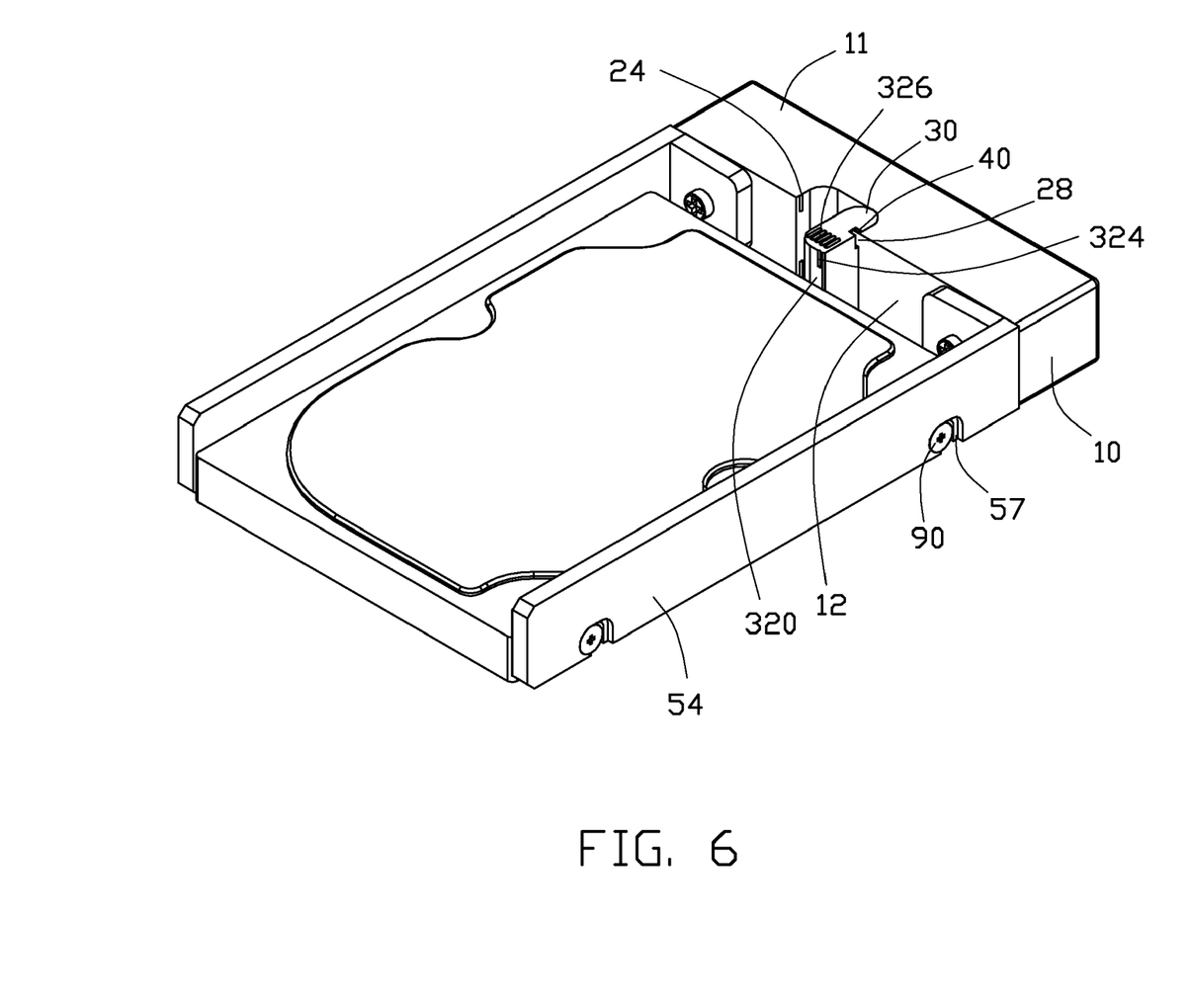
FIG. 6 shows the storage device locked on the mounting mechanism.
Figure 7:
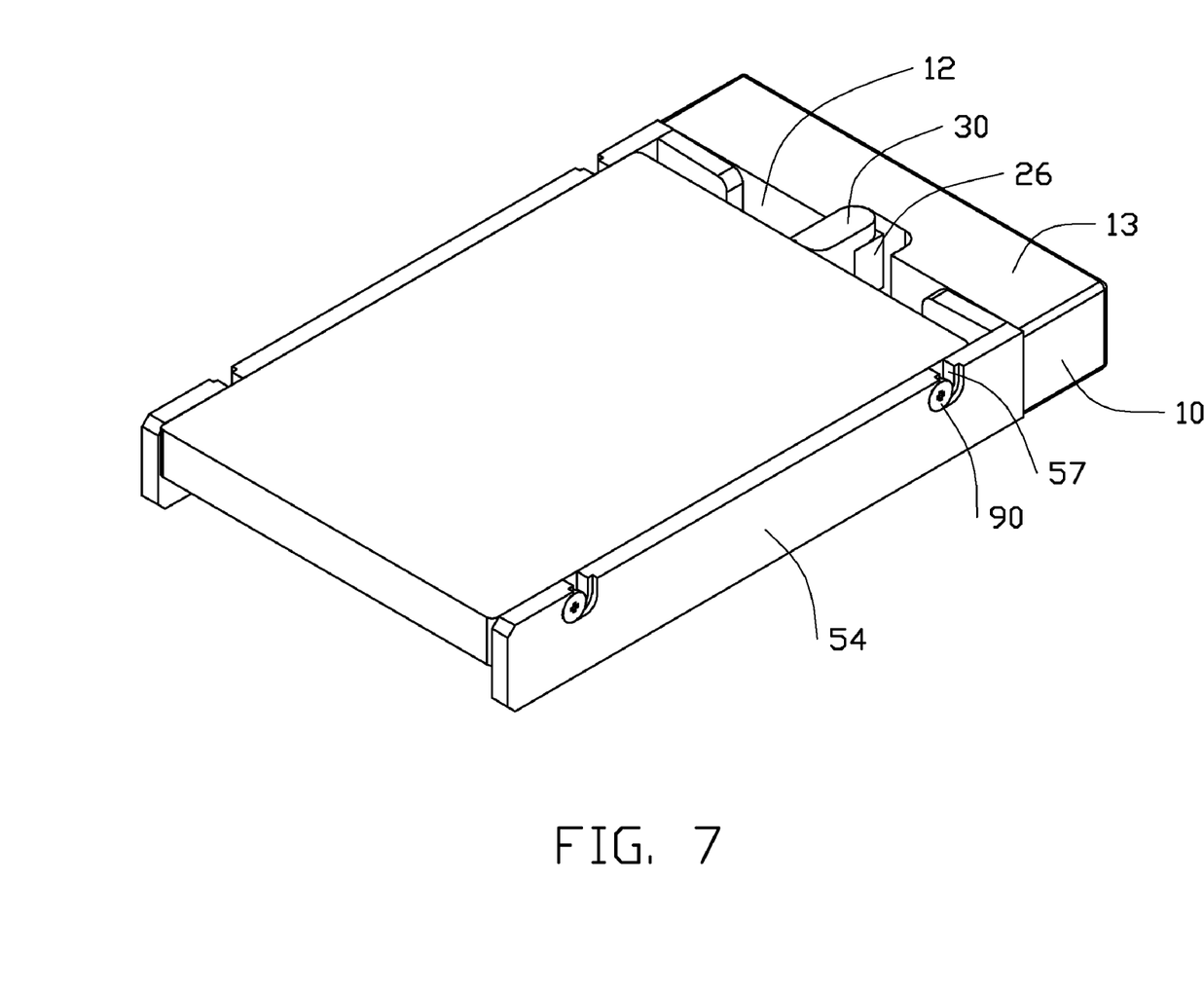
FIG. 7 is an inverted view of FIG. 6.

The rotary member 30 is rotatably connected to the sleeve 26 of the fixing member 10. Referring to FIGS. 4 and 5, when the storage device 200 is unlocked from the mounting mechanism 100, the rotary member 30 is disengaged from the storage device 200, and is received in the receiving groove 14 of the fixing member 10. As shown in FIGS. 6 and 7, when the rotary member 30 rotates out of the receiving groove 14 to engage with the storage device 200, thus the storage device 200 is locked to the mounting mechanism 100.

The rotary member 30 includes a resisting portion 32, and a pair of connecting portions 34 extending perpendicularly from top and bottom ends of the resisting portion 32, respectively. The connecting portions 34 face each other. Each connecting portion 34 includes a protrusion 36 connected to the resisting portion 32 and a pivot 38 extending perpendicularly from a central portion of the protrusion 36 towards the other connecting portion 34. A thickness of the protrusion 36 is substantially the same as the distance between the sleeve 26 and the upper face 11/lower face 13 of the fixing member 10. A lateral face 360 of each protrusion 36 away from the resisting portion 32 is curved.

The pivots 38 of the two connecting portions 34 face each other, and are spaced from each other. Each pivot 38 includes a main body 380 extending from the protrusion 36 and a guiding head 382 formed at the free end of the main body 380. A diameter of the main body 380 of the pivot 38 is substantially the same as that of the axial hole 260 of the sleeve 26. A diameter of the guiding head 382 decreases along a direction away from the main body 380. A notch 384 is defined in a middle of each pivot 38. The notch 384 extends through the guiding head 382 and the main body 380 of the pivot 38.

A column-shaped resisting face 320 is formed at a lateral side of the resisting portion 32 away from the connecting portions 34. Two slots 324 are defined in the resisting face 320 corresponding to the bulges 24 on the first interface 20 of the fixing member 10. The slots 324 are spaced from each other, and are located adjacent to top and bottom ends of the resisting portion 32, respectively. A latching groove 40 is defined at the top end of the resisting portion 32 corresponding to the hook 28 of the fixing member 10. A plurality of ribs 326 is formed on the top end of the resisting portion 32 for facilitating the handling of the rotary member 30.

When assembling the mounting mechanism 100, referring to FIGS. 1 and 3, the brackets 50 are fixed on the side face 12 of the fixing member 10 by the screws 70, and the pivots 38 of the rotary member 30 respectively inserted into the axial hole 260 via the top and bottom ends of the sleeve 26 to assemble the rotary member 30 to the fixing member 10 rotatably. During assembly, the pivots 38 can deform slightly to reduce sizes of the pivot 38 for the notches 384 defined in the pivots 38. Thus, the guiding heads 382 facilitates the deformation of the pivots 38, which in turn enables insertion into the sleeve 26 of the fixing member 10.

To facilitate assembly of the storage device 200, the rotary member 30 is rotated so as to be received in the receiving groove 14 of the fixing member 10. In such a state, the resisting face 320 of the rotary member 30 faces the first interface 20 while the lateral faces 360 of connecting portions 34 which face the second interface 22 of the fixing member 10. The bulges 24 on the first interface 20 engage respectively into the slots 324 of the resisting portion 32 to hold the rotary member 30 in the groove 14 of the fixing member 10. A narrow distance is defined between the top lateral face 360 of the protrusion 36 of the rotary member 30 and the second interface 22 of the fixing member 10 with the hook 28 located therein.

Referring to FIGS. 4 and 5, when assembling the storage device 200 to the mounting mechanism 100, the storage device 200 is disposed to the space 300 via the bottom side of the mounting mechanism 100. The bolts 90 on the storage device 200 enter into the openings 57 of the sliding grooves 56 of the brackets 50, respectively. In such a state, a distance is defined between the storage device 200 and the side face 12 of the fixing member 10 smaller than a width of the resisting portion 32 of the rotary member 30.

Referring to FIGS. 6 and 7, a force is then applied on the rotary member 30 to cause the bulges 24 of the fixing member 10 to escape from the slots 324 of the rotary member 30, and thus the resisting portion 32 of the rotary member 30 can rotate out of the receiving groove 14 of the fixing member 10. When the resisting face 320 of the resisting portion 32 rotates to engage the storage device 200, the rotation of the rotary member 30 pulls the storage device 200 to move along a direction away from the fixing member 10 for the distance between the fixing member 10 and the storage device 200. The bolts 90 of the storage device 200 slide from the openings 57 to the splits 58 to hold the storage device 200 on the mounting mechanism 100. In such a state, the rotary member 30 is perpendicular to the storage device 200, the hook 28 of the fixing member 10 engages in the latching groove 40 of the rotary member 30 to hold the rotary member 30 to engage with the storage device 200, and thus to maintain the bolts 90 in the splits 58. Accordingly, the storage device 200 is stably fixed on the fixing member 10.

To disassemble the storage device 200, a force is applied on the rotary member 30 to cause the hook 28 to escape from the latching groove 40, thus the rotary member 30 can rotate back to the receiving groove 14 of the fixing member 10. Accordingly, the engagement between the storage device 200 and the rotary member 30 is no longer inexistent, and the storage device 200 can be taken away. Therefore, the storage device 200 can be assembled to and disassembled from the computer chassis by rotating the rotary member 30 of the mounting mechanism 100, which is easy and convenient.

It is to be understood, however, that even though numerous characteristics and advantages of embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A mounting mechanism for assembling a storage device, comprising:
    a fixing member;
    a rotary member rotatably connected to the fixing member, a resisting face being formed at a lateral side of the rotary member for engaging with the storage device; and
    a pair of brackets extending from the fixing member, the pair of brackets being parallel to each other, a space being defined between the brackets for accommodating the storage device, a sliding groove being defined in each of the brackets, the sliding groove comprising a split and an opening intercommunicating the split and on a side, the opening being closer to the fixing member relative to the split;
    wherein a receiving groove is defined in the fixing member for receiving the rotary member, the receiving groove faces the space, and
    wherein a first interface and a second interface are formed on the fixing member and located at opposite sides of the receiving groove, a sleeve extends into the groove from the second interface, a pivot is formed on the rotary member and rotatably received in the sleeve, the resisting face of the rotary member abuts the first interface when the rotary member is rotated to be received in the receiving groove.

2. The mounting mechanism of claim 1, wherein a slot is defined in one of the resisting face of the rotary member and the first interface of the fixing member, and a bulge extends outwards from the other one of the resisting face of the rotary member and the first interface of the fixing member, the bulge engaging in the slot when the rotary member is rotated to be received in the receiving groove.

3. The mounting mechanism of claim 1, wherein a hook extends into the receiving groove from the second interface of the fixing member, and a latching groove is defined in the rotary member, the hook engaging in the latching groove when the resisting face of the rotary member engages with the storage device.

4. The mounting mechanism of claim 1, wherein the rotary member comprises a resisting portion and a pair of connecting portion extending perpendicularly from top and bottom ends of the resisting portion, the resisting face being formed on the resisting portion away from the connecting portions, the pivot extending from each of the connecting portions towards the other connecting portion.

5. The mounting mechanism of claim 4, wherein the pivot comprises a main body extending from the connecting portion and a guiding head formed at a free end of the main body, a diameter of the guiding head decreasing along an axial direction away from the main body.

6. The mounting mechanism of claim 5, wherein a notch extends through the pivot.

7. The mounting mechanism of claim 4, wherein a plurality of ribs are formed on the top end of the resisting portion for facilitating handling of the rotary member.

8. The mounting mechanism of claim 1, wherein a sleeve is formed on one of the fixing member and the rotary member with an axial hole defined therein, and a pivot is formed on the other one of the fixing member and the rotary member, the pivot being rotatably received in the axial hole of the sleeve.

9. A mounting mechanism for assembling a storage device with a plurality of bolts arranged at opposite sides thereof, comprising:
- a fixing member;
- a pair of brackets extending from the fixing member, the pair of brackets being parallel to each other, a space being defined between the brackets for accommodating the storage device, a sliding groove being defined in each of the brackets, the sliding groove comprising a split and an opening intercommunicating the split and on a side, the opening being closer to the fixing member relative to the split; and
- a rotary member rotatably connected to the fixing member, the rotary member comprising a resisting face for engaging with the storage device to cause the bolts sliding from the openings into the splits of the sliding grooves when the rotary member rotates outwards from the fixing member;

wherein a receiving groove is defined in the fixing member for receiving the rotary member, a first interface and a second interface are formed on the fixing member and located at opposite sides of the receiving groove, a sleeve extends into the groove from the second interface, a pivot is formed on the rotary member and rotatable received in the sleeve, the resisting face of the rotary member engages with the first interface when the rotary member is rotated to be received in the receiving groove.

10. The mounting mechanism of claim 9, wherein a slot is defined in one of the resisting face of the rotary member and the first interface of the fixing member, and a bulge extends outwards from the other one of the resisting face of the rotary member and the first interface of the fixing member, the bulge engaging in the slot when the rotary member is rotated to be received in the receiving groove.

11. The mounting mechanism of claim 9, wherein a hook extends into the receiving groove from the second interface of the fixing member, and a latching groove is defined in the rotary member, the hook engaging in the latching groove when the resisting face of the rotary member engages with the storage device.

12. The mounting mechanism of claim 9, wherein the rotary member comprises a resisting portion and a pair of connecting portions extending perpendicularly from top and bottom ends of the resisting portion, the resisting face being formed on the resisting portion away from the connecting portions, the pivot extending from each of the connecting portions towards the other connecting portion.

\* \* \* \* \*